US008849237B2

(12) United States Patent
Bourdu et al.

(10) Patent No.: US 8,849,237 B2
(45) Date of Patent: Sep. 30, 2014

(54) PRIORITY REGISTRATION FOR IN-VEHICLE EMERGENCY CALL SERVICE

(75) Inventors: Jean-Baptiste Bertrand Bourdu, South Lake Tahoe, CA (US); Nikolai Konrad Leung, Takoma Par, MD (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/328,763

(22) Filed: Dec. 16, 2011

(65) Prior Publication Data

US 2012/0289182 A1 Nov. 15, 2012

Related U.S. Application Data

(60) Provisional application No. 61/485,076, filed on May 11, 2011, provisional application No. 61/555,293, filed on Nov. 3, 2011.

(51) Int. Cl.
*H04M 11/04* (2006.01)
*G08G 1/0967* (2006.01)
*G08G 1/127* (2006.01)

(52) U.S. Cl.
CPC .............. *G08G 1/127* (2013.01); *G08G 1/0967* (2013.01)
USPC .................. 455/404.1; 455/404.2; 455/414.1; 455/435.1; 455/456.1

(58) Field of Classification Search
CPC ...... H04W 76/007; H04W 4/22; H04M 11/04
USPC ........... 455/404.1, 404.2, 414.1, 435.1, 456.1
See application file for complete search history.

(56) References Cited

U.S. PATENT DOCUMENTS 6,310,543 B1 * 10/2001 Yoshioka et al. ............. 340/436
6,324,405 B1 11/2001 Young et al.
6,574,463 B1 * 6/2003 Yoshioka .................. 455/404.2
7,333,795 B2 2/2008 Dorsey et al.
8,265,022 B2 * 9/2012 Hans ............................ 370/329

(Continued)

FOREIGN PATENT DOCUMENTS

EP 1944991 A1 7/2008
EP 1386509 B1 6/2010
WO 2007043772 A1 4/2007

OTHER PUBLICATIONS

International Search Report and Written Opinion—PCT/US2012/029998—ISA/EPO—Jun. 8, 2012.

(Continued)

*Primary Examiner* — Nghi H Ly
(74) *Attorney, Agent, or Firm* — Austin Rapp & Hardman

(57) ABSTRACT

An eCall is an emergency call that may (i) be initiated automatically by a wireless terminal due to a trigger event (e.g., a vehicle involved in an accident) or manually by a user and (ii) include additional data sent automatically by the terminal to a recipient entity, e.g., a Public Safety Answering Point (PSAP). Emergency setup signaling (e.g., an Emergency SETUP message) is used to give high priority to registering an eCall-only mode In-Vehicle System (IVS) on a mobile network. The IVS can get higher priority from the mobile network right after an eCall emergency is triggered at the IVS. When requesting a connection to the mobile network, the IVS can use an “emergency setup” message instead of a conventional “registration” message in order to register on the network.

48 Claims, 7 Drawing Sheets

(56) References Cited

U.S. PATENT DOCUMENTS

| | | | | |
|---|---|---|---|---|
| 2006/0229014 | A1* | 10/2006 | Harada et al. | 455/41.2 |
| 2007/0142028 | A1 | 6/2007 | Ayoub et al. | |
| 2008/0261557 | A1 | 10/2008 | Sim | |
| 2009/0253403 | A1 | 10/2009 | Edge et al. | |
| 2009/0280770 | A1 | 11/2009 | Mahendran | |
| 2009/0298459 | A1* | 12/2009 | Saini et al. | 455/404.1 |
| 2010/0165960 | A1 | 7/2010 | Richardson | |
| 2010/0202368 | A1 | 8/2010 | Hans | |
| 2010/0284382 | A1 | 11/2010 | Stahlin et al. | |
| 2011/0112969 | A1 | 5/2011 | Zaid et al. | |
| 2012/0289181 | A1* | 11/2012 | Bourdu et al. | 455/404.1 |
| 2012/0289185 | A1* | 11/2012 | Leung et al. | 455/404.2 |

OTHER PUBLICATIONS

MCC: "eCall initiative" , 3GPP Draft; SP-050130, 3rd Generation Partnership Project (3GPP), Mobile Competence Centre ; 650, Route Des Lucioles ; F-06921 Sophia-Antipolis Cedex ; France, TSG SA, Tokyo, Japan; 20050314, Mar. 14, 2005, XP050204354, [retrieved on Mar. 14, 2005].

Qualcomm Europe: "Support of Emergency Public User Tel URIs", Apr. 2, 2007 3GPP Draft; C1-070758 (Emergency Tel URI Discussion), 3rd Generation Partnership Project (3GPP), Mobile Competence Centre ; 650, Route Des Lucioles ; F-06921 Sophia-Anti Polis Cedex ; France, XP050024996, [retrieved on Apr. 2, 2007].

Siemens: "Optimized IMS emergency registration procedure", 3GPP Draft; S2061301, 3rd Generation Partnership Project (3GPP), Mobile Competence Centre ; 650,Route Des Lucioles; F-06921 Sophia-Antipolis Cedex ; France, SA WG2,Shanghai; 20060501, May 1, 2006, XP050255512, [retrieved on May 1, 2006].

Qualcomm Europe: "Discussion—Minimal MM Signalling for eCall Only Terminals", 3GPP Draft; C1-081685, 3rd Generation Partnership Project (3GPP), Mobile Competence Centre; 650, Route Des Lucioles ; F-06921 Sophia-Antipolis Cedex; France, vol. CT WG1, No. Cape Town; 20080515, May 15, 2008, pp. 1-2, XP050028920, [retrieved on May 15, 2008] the whole document.

Qualcomm Europe: "Support of Expedited Location Updating for an eCall only UE", 3GPP Draft; C1-082348, 3rd Generation Partnership Project (3GPP), Mobile Competence Centre; 650, Route Des Lucioles; F-06921 Sophia-Antipolis Cedex; France, vol. CT WG1, No. Zagreb, Croatia; 20080616, Jun. 16, 2008, pp. 1-3, XP050029616, [retrieved on Jun. 16, 2008] the whole document.

Qualcomm Incorporated et al., "Correction to Location area update type and RRC Connection cause for eCall test cases", 3GPP Draft; 34123-1_CR2837_(REL-9) R5-105020, 3rd Generation Partnership-Project (3GPP), Mobile Competence Centre; 650, Route Des Lucioles; F-06921 Sophia-Antipolis Cedex; France, vol. RAN WG5, No. Madrid, Spain; 20100823, Sep. 9, 2010, pp. 1-19, XP050456930, [retrieved on Sep. 9, 2010].

Taiwan Search Report—TW101109961—TIPO—Feb. 6, 2014.

* cited by examiner

PRIORITY REGISTRATION FOR IN-VEHICLE EMERGENCY CALL SERVICE

CROSS-REFERENCE TO RELATED APPLICATIONS

This application claims priority to and the benefit of Provisional Patent Application No. 61/485,076, filed on May 11, 2011 and Provisional Patent Application No. 61/555,293, filed on Nov. 3, 2011. These provisional patent applications are hereby expressly incorporated by reference herein in their entirety.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may support communication for a number of terminals. A terminal may place an emergency call in response to an emergency event. An emergency call is a call for emergency services (e.g., police, fire, medical, or other emergency services) and may also be referred to as an emergency services call. An emergency call may be initiated by a user dialing a well-known emergency number such as "911" in North America or "112" in Europe. It may be desirable to efficiently exchange signaling between the terminal and the wireless network for the emergency call.

eCall refers to an in-vehicle emergency call service. In the event of a collision involving the vehicle, the eCall In-Vehicle System (IVS) establishes an emergency call via a mobile network (also referred to as a wireless network or a cellular network) to emergency agencies, e.g., a Public-Safety Answering Point (PSAP). The IVS can be provisioned for "eCall-only" service or for "mixed-mode eCall" service. In "mixed-mode eCall" service, the system can be used to perform emergency eCalls as well as non-emergency, subscription-based calls. In "eCall-only" mode, the system can only be activated to make eCalls.

More particularly, dedicated eCall devices, such as those associated with a vehicle and designed for the sole purpose to make emergency calls in the event of an accident, are generally referred to as devices that operate in "eCall-only mode." That is, eCall-only mode requires at least that the device does not perform mobility management procedures, including registration on a Public Land Mobile Network (PLMN), except when the device is attempting to initiate and during an emergency call, or when the device is attempting to initiate a test or reconfiguration connection.

An IVS in eCall-only mode does not register on the mobile network before the eCall is triggered. In case of an eCall emergency trigger, two operations are performed: (1) the IVS has to register on the mobile network and then (2) the IVS initiates the eCall emergency call. Conventionally, registration on the mobile network for an eCall is performed with the same priority as non-emergency calls. Conventional registration of the IVS on the mobile network may lead to a delay in placing the emergency call. It is critical that an IVS in eCall-only mode be able to successfully register as fast as possible after an incident triggers an eCall.

SUMMARY

An eCall is an emergency call that may (i) be initiated automatically by a wireless terminal due to a trigger event (e.g., a vehicle involved in an accident) or manually by a user and (ii) include additional data sent automatically by the terminal to a recipient entity, e.g., a Public Safety Answering Point (PSAP). Emergency setup signaling (e.g., an Emergency SETUP message) is used to give high priority to registering an eCall-only mode In-Vehicle System (IVS) on a mobile network. The IVS can get higher priority from the mobile network right after an eCall emergency is triggered at the IVS. When requesting a connection to the mobile network, the IVS can use an "emergency setup" message instead of a conventional "registration" message in order to register on the network.

In an implementation, an emergency is triggered in a vehicle comprising an IVS for making an emergency call via a mobile network. The mobile network may be a home network or a visited network, and the IVS is only operable to place a call in emergency mode. An emergency setup message is generated at the IVS, and the emergency setup message is transmitted from the IVS to the mobile network for registering the IVS on the mobile network. The emergency setup message is different from a registration message for registering a device on the mobile network. A high priority is received for registration of the IVS on the mobile network responsive to the emergency setup message being received at the mobile network.

In an implementation, the IVS is registered immediately on the mobile network responsive to the emergency setup message being received at the mobile network. The IVS is registered immediately on the mobile network regardless of whether the mobile network is a visited network or a home network.

In an implementation, the emergency setup message may be recognized by a home network which in turn immediately accepts a registration request from an eCall-only subscriber attempting to register with any roaming network (e.g., a visited network). In an implementation, the emergency setup message may be recognized by the visited network which in turn immediately accepts a registration request from an eCall-only subscriber.

In an implementation, an emergency call by the IVS is initiated over the mobile network after the IVS is registered on the mobile network. The emergency call is initiated by the IVS using the emergency setup message.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Techniques for supporting eCalls are described herein. An eCall is an emergency call that may (i) be initiated automatically by a wireless terminal due to a trigger event (e.g., a vehicle involved in an accident) or manually by a user and (ii) include additional data sent automatically by the terminal to a recipient entity, e.g., a Public Safety Answering Point (PSAP). The additional data may include vehicle identification, vehicle location, trigger event, etc., and may be sent inband along a voice path or out-of-band via separate signaling or data/text transfer. A terminal that supports eCall may be (i) a normal wireless terminal that subscribes to normal services such as voice calls, packet data, text messages, video, etc. or (ii) a terminal that supports only eCalls, which is referred to as an eCall-only terminal. An eCall comprises an emergency call (similar to an emergency call initiated by a user dialing “911”) plus automatic sending of additional data to the recipient entity.

As described further herein, “emergency setup” signaling (e.g., an “Emergency SETUP message”) is used to give high priority to registering an eCall-only mode IVS on a mobile network. The IVS can get higher priority from the mobile network right after an eCall emergency is triggered at the IVS. When requesting a connection to the mobile network, the IVS can use an “emergency setup” message instead of a conventional “registration” message in order to register on the network.

When the IVS is “roaming” and its Home Public Land Mobile Network (HPLMN) or “home network” is unavailable, the IVS must register on a Visitor Public Land Mobile Network (VPLMN) or “roaming network” if one is available. Before a roaming network can register the IVS, however, it must receive permission from the IVS’s home network. However, it is not uncommon for such permission to be denied, especially in typical instances where the home network has a roaming registration management policy (RRMP) that only permits registrations (and subsequent call servicing) by preferred VPLMN partners (“preferred partners”) with whom the home network has established favorable business arrangements. Thus, in operation, the home network might automatically reject registrations from non-preferred roaming networks unless and until it receives and accepts a registration request through one of its preferred partners. As further described herein, the emergency setup message may be recognized by the home network (an HPLMN) which in turn immediately accepts a registration request from an eCall-only subscriber attempting to register with any roaming network (a VPLMN). The emergency setup message may be recognized by the visited network which in turn immediately accepts a registration request from an eCall-only subscriber.

Figure 1:
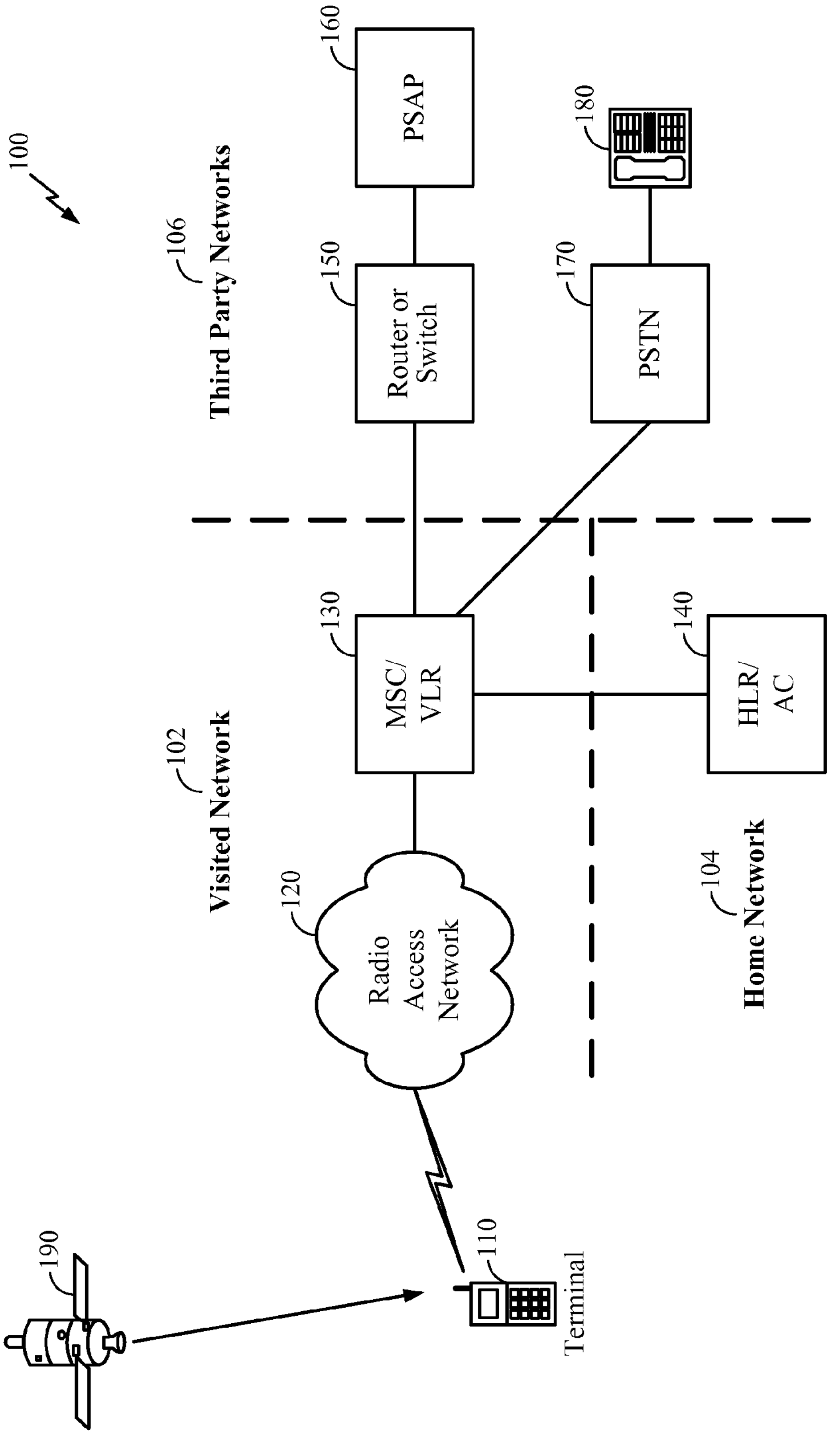
FIG. 1 shows an exemplary network deployment.

FIG. 1 shows an exemplary network deployment 100, which may include a visited network 102, a home network 104, and third party networks 106. Visited network 102 may also be referred to as a Visited Public Land Mobile Network (V-PLMN), a serving network, etc. Home network 104 may also be referred to as a Home PLMN (H-PLMN). Visited network 102 may be a serving network for a terminal 110, which may be roaming from its home network 104. Visited network 102 and home network 104 may be the same network if terminal 110 is not roaming.

Visited network 102 may include a radio access network (RAN) 120, a Mobile Switching Center (MSC)/Visitor Location Register (VLR) 130, and other network entities not shown in FIG. 1 for simplicity. RAN 120 may be a Global System for Mobile Communications (GSM) network, a Wideband Code Division Multiple Access (WCDMA) network, a General Packet Radio Service (GPRS) access network, a Long Term Evolution (LTE) network, CDMA 1X network, a High Rate Packet Data (HRPD) network, an Ultra Mobile Broadband (UMB) network, etc. GSM, WCDMA, GPRS and LTE are part of Universal Mobile Telecommunication System (UMTS) and are described in documents from an organization named “3rd Generation Partnership Project” (3GPP). CDMA 1× and HRPD are part of cdma2000, and cdma2000 and UMB are described in documents from an organization named “3rd Generation Partnership Project 2” (3GPP2). The MSC may perform switching functions for circuit-switched calls and may also route Short Message Service (SMS) messages. The VLR may store registration information for terminals that have registered with visited network 102.

Home network 104 may include a Home Location Register (HLR)/Authentication Center (AC) 140 and other network entities not shown in FIG. 1 for simplicity. The HLR may store subscription information for terminals that have service subscription with home network 104. The AC may perform authentication for terminals having service subscription with home network 104.

Third party networks 106 may include a router or switch 150 (e.g., a PSAP selected router), a PSAP 160, a Public Switched Telephone Network (PSTN) 170, and possibly other network entities not shown in FIG. 1. Router or switch 150 may route calls between MSC 130 and PSAP 160. PSAP 160 may be responsible for answering emergency calls and may also be referred to as an Emergency Center (EC). PSAP 160 may be operated or owned by a government agency, e.g., a county or city. PSTN 170 may provide telephone services for conventional wireline telephones, such as a telephone 180.

FIG. 1 shows only some of the network entities that may be present in visited network 102 and home network 104. For example, visited network 102 may include network entities supporting packet-switched calls and other services as well a location server to assist in obtaining terminal location.

Terminal 110 may be stationary or mobile and may also be referred to as a mobile station (MS) in GSM and CDMA 1X, a user equipment (UE) in WCDMA and LTE, an access terminal (AT) in HRPD, a SUPL enabled terminal (SET) in Secure User Plane Location (SUPL), a subscriber unit, a station, etc. Terminal 110 may be a device such as a cellular phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. Terminal 110 may also be devices which communicate with a personal navigation device (PND), such as by short-range wireless, infrared, wireline connection, or other connection—regardless of whether satellite signal reception, assistance data reception, and/or position-related processing occurs at the device or at the PND. Also, terminal 110 is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also included. Terminal 110 may also be a dedicated In-Vehicle System (IVS), which may be permanently attached to (and possibly part of) a vehicle.

Terminal 110 may have a service subscription with home network 104 and may be roaming in visited network 102, as shown in FIG. 1. Terminal 110 may receive signals from RAN 120 in visited network 102 or may communicate with the RAN to obtain communication services. Terminal 110 may also communicate with home network 104 for communication services when not roaming (not shown in FIG. 1). Terminal 110 may also receive signals from one or more satellites 190, which may be part of a satellite positioning system (SPS). An SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). Terminal 110 may measure signals from satellites 190 and obtain pseudo-range measurements for the satellites. Terminal 110 may also measure signals from base stations in RAN 120 and obtain timing and/or signal strength measurements for the base stations. The pseudo-range measurements, timing measurements and/or signal strength measurements may be used to derive a position estimate for terminal 110. A position estimate may also be referred to as a location estimate, a position fix, etc.

Terminal 110 may have an International Mobile Equipment Identity (IMEI), which is a unique number assigned to the terminal. Terminal 110 may be used for a service subscription of a user. The service subscription may be associated with an International Mobile Subscriber Identity (IMSI), which is a unique number assigned to a subscription for GSM and UMTS networks. The service subscription may also be associated with a Mobile Subscriber Integrated Services Digital Network Number (MSISDN), which is a telephone number for the service subscription. The IMSI may be used as a key for the service subscription in a subscriber database in the HLR. The MSISDN may be dialed by other users to connect calls to terminal 110 used for the service subscription. The IMSI, the MSISDN, and other subscription information may be stored in a Subscriber Identity Module (SIM) or a Universal Subscriber Identity Module (USIM), which may be inserted into terminal 110. Terminal 110 may also have no SIM/USIM, in which case terminal 110 may have only an IMEI but no IMSI or MSISDN.

Wireless networks may be required to support different types of emergency calls. One type may include "normal" emergency calls originated by users dialing well-known emergency numbers such as "911" in North America and "112" in Europe. Another type may include eCalls, which are emergency calls that may have the characteristics described above. Support for eCalls may be required by the European Union and by other world regions and/or countries. An eCall may be different from a normal emergency call in the manners in which the call is placed and the additional emergency related data that may be sent to establish the eCall and used to process the eCall. For example, the additional data may indicate how the eCall was initiated, a registration priority request, information pertaining to the IVS (e.g., eCall-only mode or mixed-mode), a vehicle type and vehicle identification number (VIN), a timestamp, a position estimate and position confidence flag, the direction of travel, the number of passengers (e.g., with fastened seatbelts), a service provider for the terminal (if any), a trigger type (e.g., deployed airbags, bumper sensors, etc.), and possibly other information. The additional data may enable a higher priority registration as described further herein, and an accurate geographic location of the terminal to be provided to a PSAP.

Figure 2:
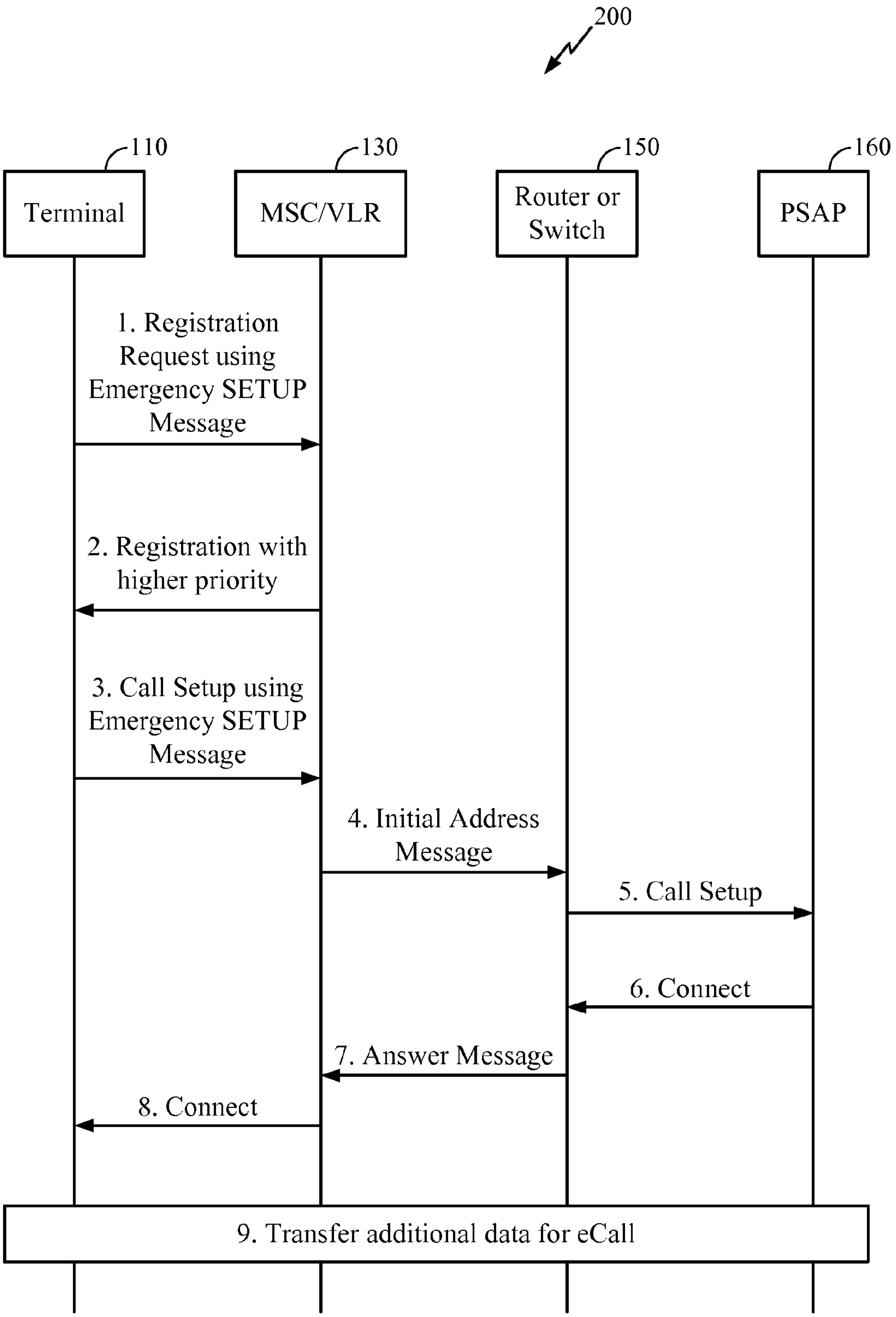
FIG. 2 shows a message flow for establishing an eCall by a terminal.

FIG. 2 shows a design of a message flow 200 for establishing (e.g., registering and placing) an eCall by terminal 110 in FIG. 1. For simplicity, some network entities (e.g., RAN 120) and some less pertinent signaling messages are not shown in FIG. 2. Terminal 110 may generate an Emergency SETUP message containing data and/or signaling to indicate that the terminal is an eCall-only IVS and is seeking registration on the mobile network. This registration request using an Emergency SETUP message may be sent to the MSC/VLR 130 to request registration for service (step 1). MSC/VLR 130 may receive the message and may respond by registering the terminal 110 on the mobile network at a higher priority (step 2).

In some implementations, the registration request may be immediately approved by either the IVS's home network or the network on which the IVS is seeking registration (e.g., the visited network) pursuant to receiving the Emergency SETUP message. In this manner, to make an emergency call while roaming, an eCall-only IVS will not have to attempt registering with several available roaming networks before one is finally accepted by the IVS's home network (if at all). Instead, registration will be accepted immediately.

Terminal 110 may then send an Emergency SETUP message to place an eCall (step 3). The Emergency SETUP message may be the same message as the Emergency SETUP message that had been previously sent for registration of the terminal 110, or may be a different or newly generated Emergency SETUP message.

MSC/VLR 130 may receive the message and may send an Initial Address Message to router or switch 150 to originate a call for terminal 110 (step 4). Router or switch 150 may then send a Call Setup message to PSAP 160 to establish the call for terminal 110 (step 5). PSAP 160 may return a Connect message to router or switch 150 (step 6), which may then return an Answer Message to MSC/VLR 130 (step 7). MSC/VLR 130 may then return a Connect message to terminal 110 (step 8). Terminal 110 may transfer additional data for the eCall to the network for possible forwarding to PSAP 160 (step 9). The transfer of additional data may also be performed in steps 3, 4 and 5 or some other steps prior to step 9. In any case, the eCall may be established for terminal 110 after steps 8 and 9. Terminal 110 may then communicate with PSAP 160 for the eCall.

An eCall may be initiated automatically by terminal 110 (e.g., due to a vehicle collision) or manually by a user (e.g., a vehicle occupant). Terminal 110 may be any device supporting eCall functionality such as a cellular phone, an IVS, etc. In one design, terminal 110 may provide an eCall indicator in the emergency call setup. The eCall indicator may convey one of the following: Manually Initiated eCall (MIeC) originated by the user, or Automatically Initiated eCall (AIeC) originated by the terminal.

The eCall indicator may be used by a wireless network to differentiate the eCall from normal emergency calls, to filter or route the eCall to an appropriate PSAP (e.g., a PSAP equipped to receive eCalls), and/or for other purposes such as to identify the terminal as an eCall-only IVS. The eCall indicator may be conveyed by terminal 110 in various manners during emergency call setup. The eCall indicator may be sent in a Service Request message, an Emergency SETUP message, a SETUP message, or some other message sent by terminal 110.

Figure 3:
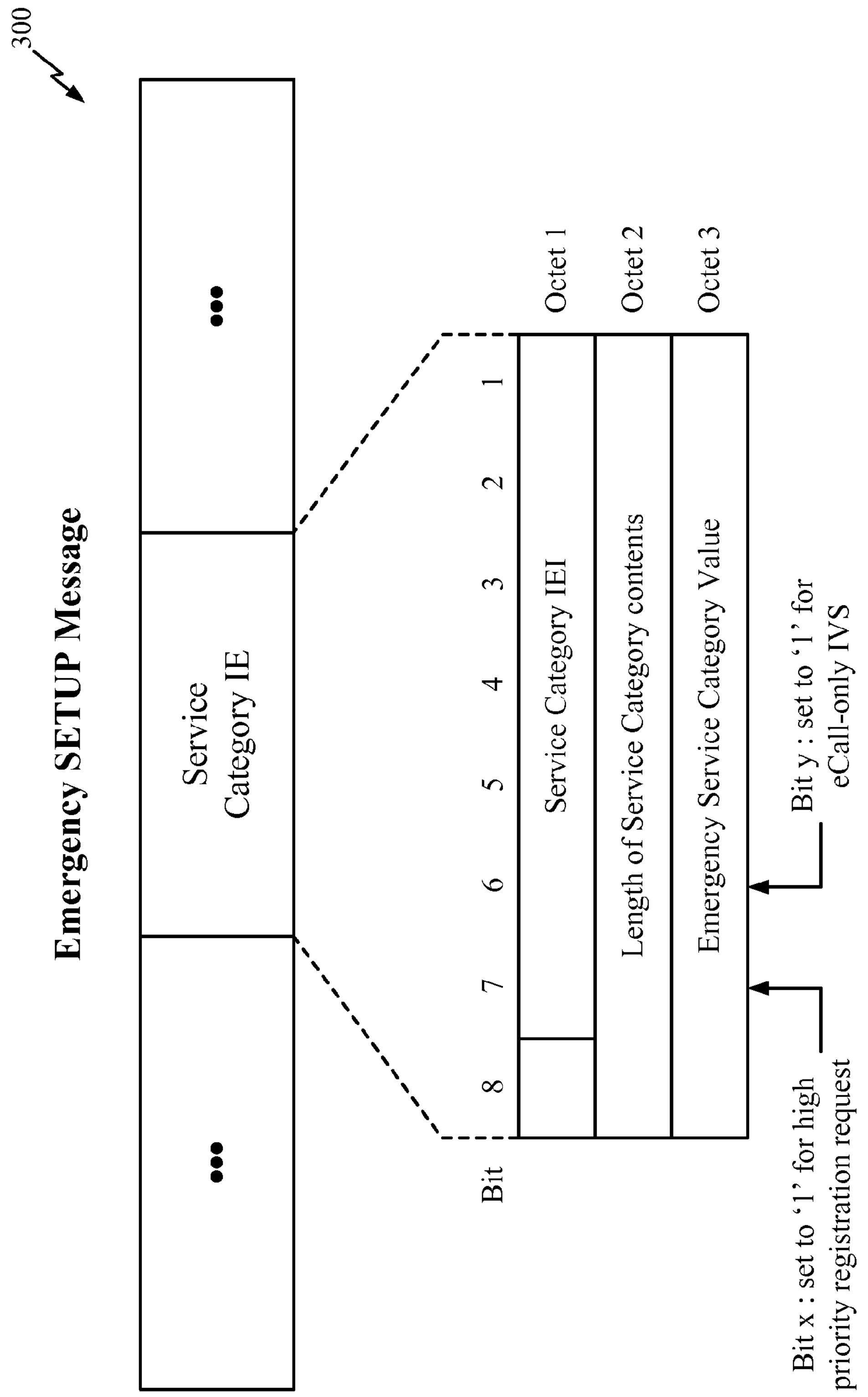
FIG. 3 shows an Emergency SETUP message carrying an eCall indicator.

FIG. 3 shows a design of an Emergency SETUP message 300 that may carry one or more indicators requesting higher priority registration for an eCall-only IVS. The Emergency SETUP message may include various information elements (IEs), one of which may be a Service Category IE used to provide a wireless network with information about services being invoked by a terminal. For an eCall, the Service Category IE may include (i) a Service Category IE identifier (IEI) that may be set to a specific value assigned to the Service Category IE, (ii) a Length of Service Category field that may indicate the length of the Service Category IE, and (iii) an Emergency Service Category Value field that may provide information for an eCall.

In the design shown in FIG. 3, a higher priority registration for an eCall-only IVS indicator may be implemented with two bits in the Emergency Service Category Value field. One bit (labeled as bit x) may be set to "1" to convey a high priority registration request or to "0" otherwise. The other bit (labeled as bit y) may be set to "1" to convey an eCall-only IVS or to "0" otherwise. In another design, a higher priority registration for an eCall-only IVS indicator may be implemented with a single bit that may be set to "1" to indicate a high priority registration request for an eCall-only IVS or to "0" otherwise. The eCall indicator may also be implemented in other manners in the Service Category IE or elsewhere in the Emergency SETUP message.

In another design, a new IE may be defined to carry the higher priority registration for an eCall-only IVS indicator. This new IE may be assigned a separate IEI and may convey the indicator with one or two bits, which may be set as described above for the Service Category IE.

Figure 4:
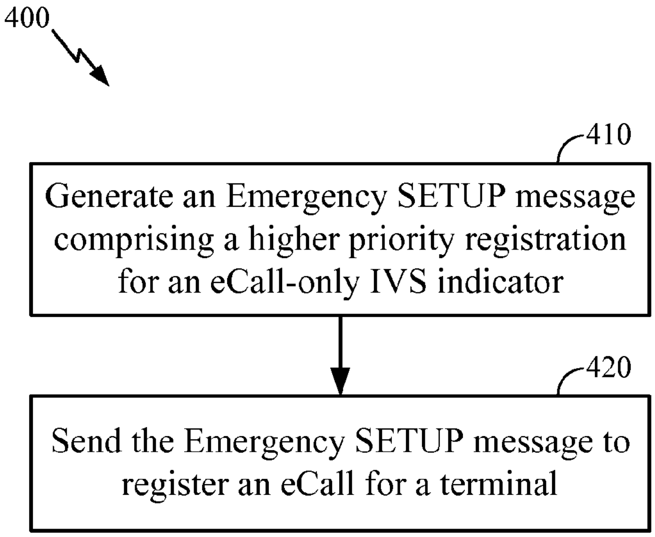
FIG. 4 shows a process performed by a terminal for eCall registration using an Emergency SETUP message.

FIG. 4 shows a design of a process 400 performed by a terminal for eCall registration. At 410, the terminal may generate an Emergency SETUP message comprising an indicator that the terminal is an eCall-only IVS and a high priority registration is sought. At 420, the terminal may send the message to register the terminal for an eCall. The registration may allow the network to learn of the terminal's presence.

In a first design, the Emergency SETUP message may comprise a Service Category information element having at least one bit used for the eCall indicator, e.g., as shown in FIG. 3. In one design, the at least one bit used for the eCall indicator may comprise (i) a first bit indicating a high priority registration request and (ii) a second bit indicating an eCall-only IVS. In another design, the at least one bit used for the indicator may comprise a single bit indicating a high priority registration request for an eCall-only IVS.

The indicator provides an indication to the network, which may be the visited network or the home network, that the IVS is in an emergency. In this manner, the home network does not need to separately determine (e.g., using a lookup table or by subsequent messaging, probing, or signaling) that the IVS is in an emergency and is an eCall-only IVS. In an implementation, the visited network (or the home network) may immediately register the IVS on the network pursuant to receiving the Emergency SETUP message with the high priority registration request. Thus, conventional roaming registration of the IVS on the mobile network is avoided.

Figure 5:
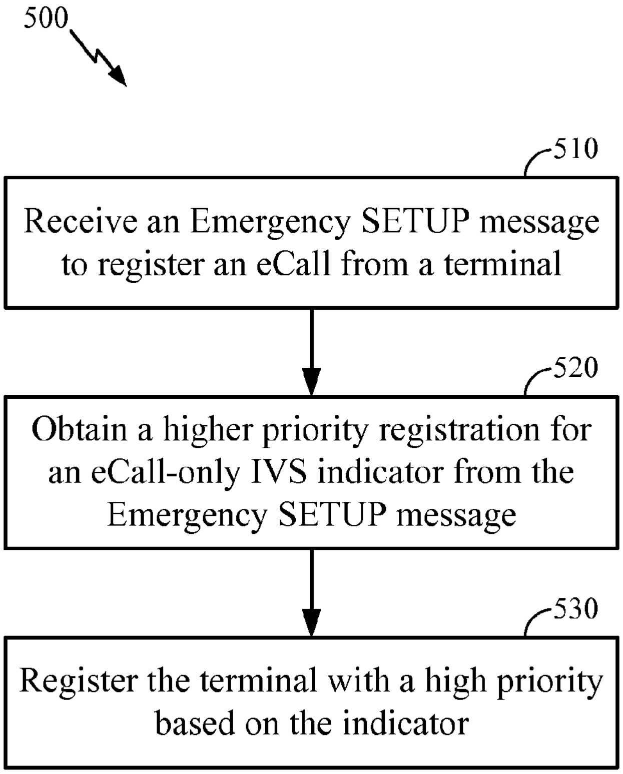
FIG. 5 shows a process performed by a network to support eCall registration using an Emergency SETUP message.

FIG. 5 shows a design of a process 500 performed by a wireless network to support eCall registration. At 510, the network may receive a message to register an eCall from a terminal. The message may be an Emergency SETUP message instead of a typical or conventional registration message. At 520, the network may obtain an indicator from the message. The indicator may comprise information that the terminal is an eCall-only IVS and requests a high priority registration. At 530, based on the indicator in the message, the network may register the terminal with the network at a high priority for a subsequent call for emergency services.

After the terminal is registered, then an emergency call may be placed. The emergency setup signaling conventionally is used only to initiate the eCall emergency call after registration of the IVS on the mobile network. Here, in an implementation, the emergency setup signaling (e.g., the Emergency SETUP message) is used to give high priority to registering an eCall-only mode IVS on a mobile network. Thus, the IVS can get higher priority from the mobile network right after an eCall emergency is triggered at the IVS.

When requesting a connection to the mobile network, the IVS can use "emergency setup" instead of "registration" in order to register on the network. With "emergency setup" used in the establishment of a connection, the IVS will have higher priority to register and this assures that the emergency victims will get the fastest connection to the rescue or emergency services team. It is noted that even after the IVS is registered using the emergency setup, the emergency call itself must be initialized and placed.

Figure 6:
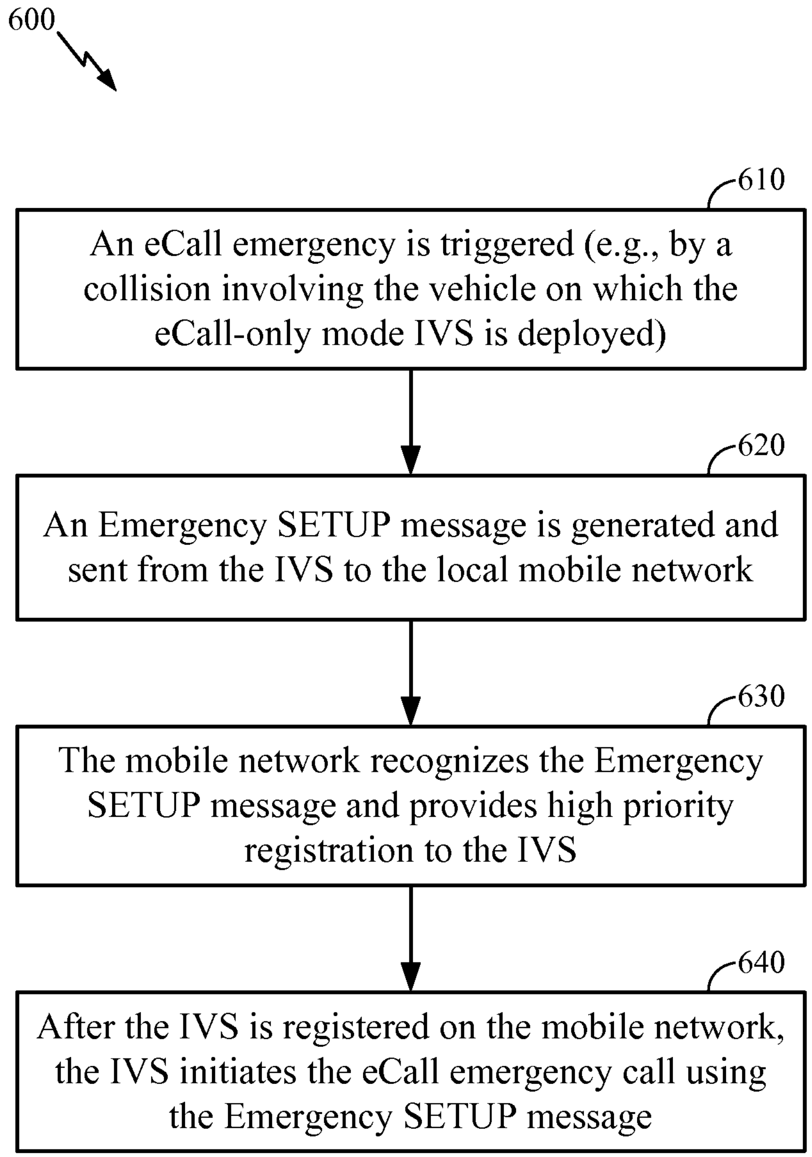
FIG. 6 is an operational flow of a method of establishing an emergency call via a mobile network.

FIG. 6 is an operational flow of a method 600 of establishing an emergency call via a mobile network. At 610, an eCall emergency is triggered (e.g., by a collision involving the vehicle on which the eCall-only mode IVS is deployed). At 620, an Emergency SETUP message is generated by the IVS and sent from the IVS to the local mobile network. An example Emergency SETUP message is described above with respect to FIG. 3.

At 630, the mobile network recognizes the Emergency SETUP message and provides high priority registration to the IVS. At 640, after the IVS is registered on the mobile network, the IVS initiates the eCall emergency call using the Emergency SETUP message (or a different message, depending on the implementation).

Figure 7:
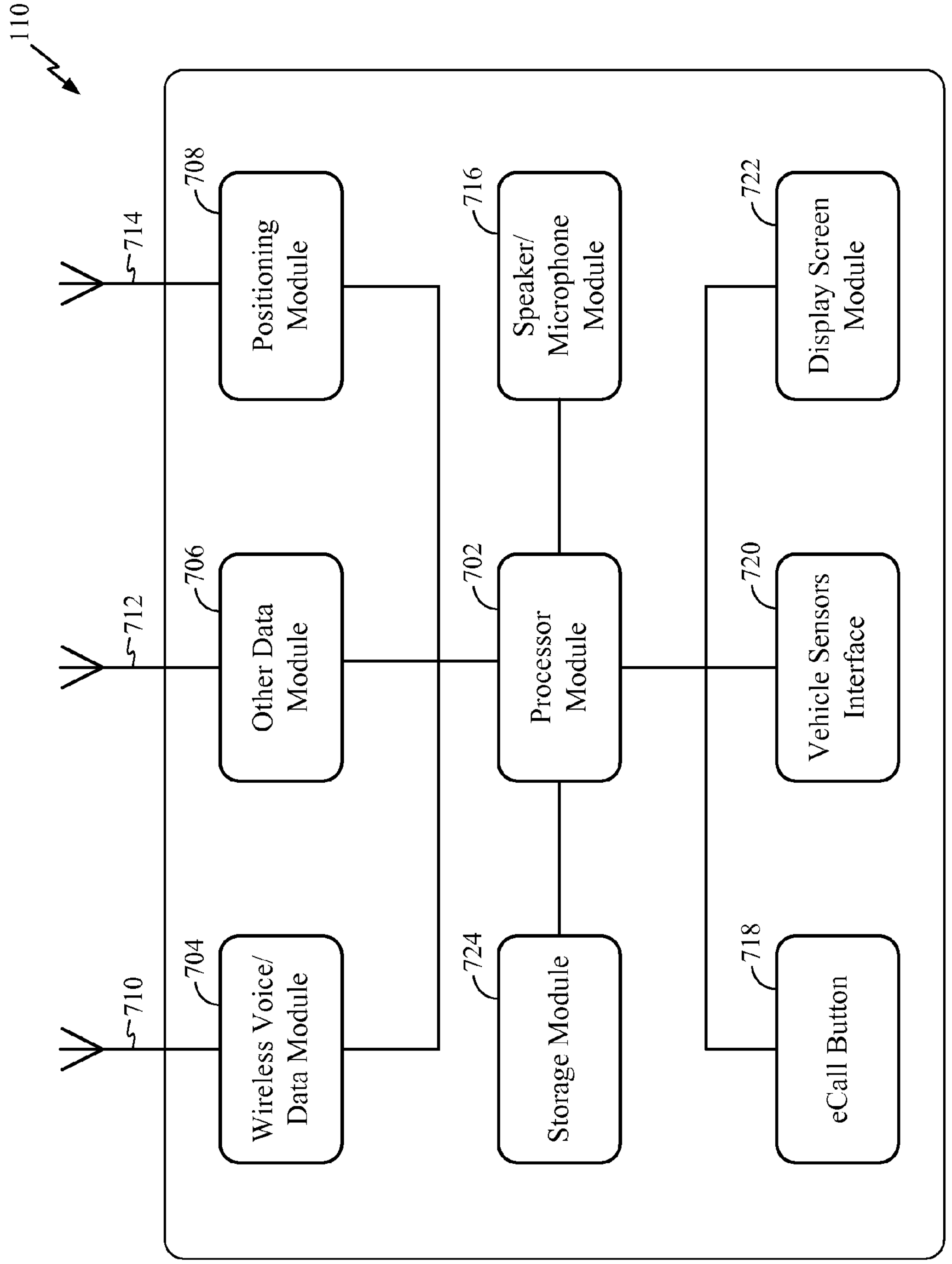
FIG. 7 is a block diagram of an exemplary IVS wireless device or apparatus that may be provisioned to operate as an eCall-only capable device illustrative of various implementations disclosed herein.

FIG. 7 is a block diagram of an exemplary IVS (e.g., terminal 110) wireless device or apparatus that may be provisioned to operate as an eCall-only capable device illustrative of various implementations disclosed herein. The IVS or terminal 110 may include a processor module 702 coupled to a plurality of wireless modules that enable the IVS 110 to communicate wirelessly. For example, the wireless modules may include a wireless voice/data module 704, an other data module 706 (e.g., Bluetooth module), and a positioning module 708 (e.g., GPS module), although the IVS 110 is not limited to the illustrated wireless modules. Each of the illustrated wireless modules is coupled to an antenna 710, 712, and 714, respectively. Although the antennas 710, 712, and

714 are shown as separate antennas, a single unitary antenna may also be used and coupled to the modules 704-708.

The processor module 702 may also be coupled to a speaker/microphone module 716, an eCall button 718, a vehicle sensors interface 720 and a display screen module 722. Furthermore, the processor module 702 may be coupled to a storage module 724 that may include information that provisions the IVS 110 as an eCall-only capable device. The eCall button 718 may be used to manually initiate an emergency call in the event of an accident or other situation requiring attention or assistance from emergency services. The vehicle sensors interface 720 may be coupled to sensors (not illustrated) deployed in a vehicle and designed to detect an accident condition that may require attention or assistance from emergency services. Such vehicle sensors may be attached to an airbag deployment mechanism, vehicle body integrity sensors, or the like.

The IVS 110 may be configured to transmit and receive voice and data communications to and from the MSC 130 via the RAN 120 during emergency calls (following registration). The MSC 130 enables emergency information from the IVS 110 to be communicated to the PSAP 160 via the router or switch 150 or the PSTN 170. Such emergency information may be communicated to the PSAP 160 once the IVS initiates an emergency call using the appropriate emergency number (e.g., 112, 911, 000, etc.) stored in the device. The emergency information may include voice communications directly from a user and via the speaker/microphone module 716, data generated from sensors coupled to the vehicle sensors interface 720, and positioning information from the positioning module 708.

As mentioned earlier, the IVS 110 may be provisioned as an eCall-only device, and such provisioning information may be stored in the storage module 724. The storage module 724 may be a nonvolatile storage, volatile storage, a Subscriber Identity Module (SIM), a Universal Subscriber Identity Module (USIM), or any other suitable storage capable element.

The speaker/microphone module 716 may be used during voice calls between the IVS 110 and the PSAP 160. Telematics application specific buttons, such as the eCall button 718, may be used to activate the eCall-only IVS or otherwise initiate the generation and transmittal of specific emergency data messages and/or emergency voice communications to the PSAP 160 via the eCall system. Furthermore, initiation of data communication may also be accomplished automatically via vehicle sensors, such as sensors coupled to the airbag deployment mechanism.

Each of the wireless modules 704-708 includes a transmitter to transmit and encode voice and data messages using antennas 710-714, respectively, via an over-the-air protocol such as CDMA, WCDMA, GSM, TDMA, or the like. The wireless modules 704-708 may also be configured to transmit by other wireless communications, such as satellite communications. Each of the wireless modules 704-708 also includes a receiver to receive and decode voice and data messages from the cell site, the MSC 130, and the PSAP 160, or any other component associated with the communications network 100. Such received voice and data messages may be received via an over-the-air protocol such as CDMA, WCDMA, GSM, TDMA, or the like. The wireless modules 704-708 may also be configured to receive other wireless communications, such as satellite communications. The transmitters and receivers may be integrated transceiver devices. These elements are discussed in more detail in FIG. 8.

Figure 8:
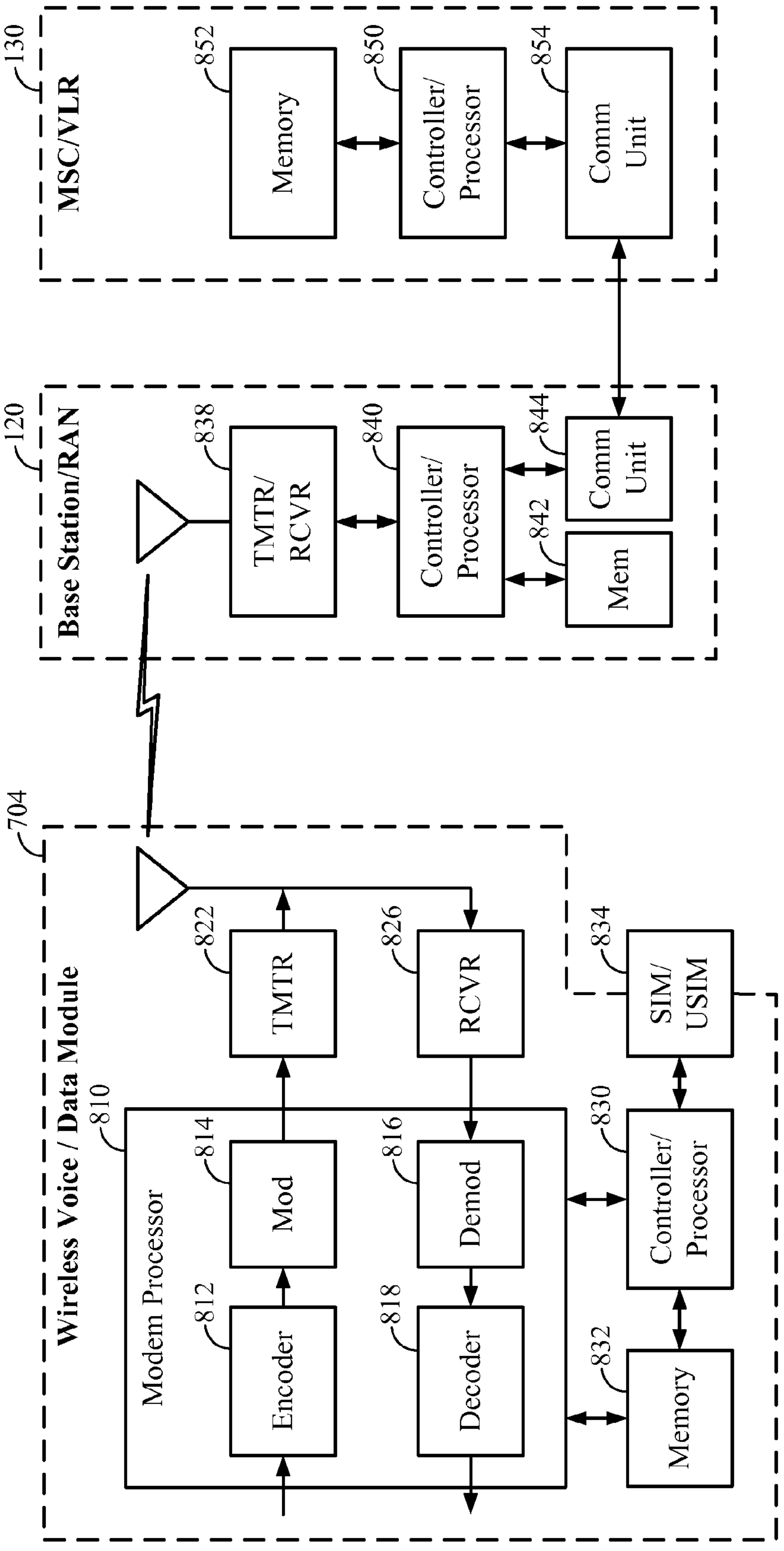
FIG. 8 shows a block diagram of a terminal, a base station, and an Mobile Switching Center (MSC).

FIG. 8 shows a block diagram of a design of wireless voice/data module 704 (of terminal 110), base station/RAN 120, and MSC/VLR 130 in FIGS. 1 and 7. At wireless voice/data module 704, an encoder 812 may receive data and messages to be sent by wireless voice/data module 704. The messages may be for registration, location updating, call establishment, etc. Encoder 812 may process (e.g., encode and interleave) the data and messages and provide coded data and coded signaling. A modulator (Mod) 814 may further process (e.g., modulate, channelize, and scramble) the coded data and signaling and provide output samples. A transmitter (TMTR) 822 may condition (e.g., convert to analog, filter, amplify, and frequency upconvert) the output samples and generate an uplink signal, which may be transmitted to one or more base stations in RAN 120. Wireless voice/data module 704 may also receive downlink signals transmitted by one or more base stations. A receiver (RCVR) 826 may condition (e.g., filter, amplify, frequency downconvert, and digitize) a received signal and provide input samples. A demodulator (Demod) 816 may process (e.g., descramble, channelize, and demodulate) the input samples and provide symbol estimates. A decoder 818 may process (e.g., deinterleave and decode) the symbol estimates and provide decoded data and messages sent to wireless voice/data module 704. Encoder 812, modulator 814, demodulator 816, and decoder 818 may be implemented by a modem processor 810. These units may perform processing in accordance with the radio technology (e.g., GSM, WCDMA, LTE, etc.) used by the wireless network with which wireless voice/data module 704 is in communication. A controller/processor 830 may direct the operation of various units at wireless voice/data module 704. Processor 830 and/or other modules at wireless voice/data module 704 may perform or direct process 400 in FIG. 4, and/or other processes for the techniques described herein. Memory 832 may store program codes and data for wireless voice/data module 704. A SIM/USIM 834 may store subscription information for a service subscription used for wireless voice/data module 704.

At base station/RAN 120, a transmitter/receiver 838 may support radio communication with wireless voice/data module 704 and other terminals. A controller/processor 840 may perform various functions for communication with the terminals. For the uplink, the uplink signal from wireless voice/data module 704 may be received and conditioned by receiver 838 and further processed by controller/processor 840 to recover the data and messages sent by wireless voice/data module 704. For the downlink, data and messages may be processed by controller/processor 840 and conditioned by transmitter 838 to generate a downlink signal, which may be transmitted to wireless voice/data module 704 and other terminals. Memory 842 may store program codes and data for base station/RAN 120. A communication (Comm) unit 844 may support communication with MSC/VLR 130 and other network entities.

At MSC/VLR 130, a controller/processor 850 may perform various functions to support communication services for the terminals. Memory 852 may store program codes and data for MSC/VLR 130. A communication unit 854 may support communication with base station/RAN 120 and other network entities. Controller/processor 850 and/or other modules at MSC/VLR 130 may perform or direct all or part of process 500 in FIG. 5, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term “memory” refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Call registration techniques may be implemented in conjunction with various wireless communication networks such as a wireless wide area network (WWAN), a wireless local area network (WLAN), a wireless personal area network (WPAN), and so on. The term “network” and “system” are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named “3rd Generation Partnership Project” (3GPP). Cdma2000 is described in documents from a consortium named “3rd Generation Partnership Project 2” (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of establishing an emergency call, comprising:

triggering an emergency in a vehicle comprising an in-vehicle system (IVS) for making an emergency call via a mobile network;

generating an emergency setup message at the IVS;

transmitting the emergency setup message from the IVS to the mobile network, wherein the emergency setup message is used for registering the IVS on the mobile network; and initiating an emergency call by the IVS using the emergency setup message.

2. The method of claim 1, further comprising receiving a high priority for registration of the IVS on the mobile network responsive to the emergency setup message being received at the mobile network.

3. The method of claim 2, wherein the IVS is registered on the mobile network with the high priority.

4. The method of claim 3, wherein the initiating an emergency call by the IVS is performed over the mobile network after the IVS is registered on the mobile network.

5. The method of claim 1, wherein the IVS is only operable to place a call in emergency mode.

6. The method of claim 1, wherein the emergency setup message is different from a registration message for registering a device on the mobile network.

7. The method of claim 1, wherein the emergency setup message comprises a service category information element having at least one bit used for an emergency call indicator.

8. The method of claim 7, wherein the at least one bit comprises a first bit indicating a high priority registration request and a second bit indicating an emergency call only IVS.

9. The method of claim 1, wherein the IVS is registered immediately on the mobile network responsive to the emergency setup message being received at the mobile network.

10. The method of claim 9, wherein the IVS is registered immediately on the mobile network regardless of whether the mobile network is a visited network or a home network.

11. The method of claim 1, wherein the mobile network is a visited network.

12. The method of claim 1, wherein the mobile network is a home network.

13. The method of claim 1, wherein the network is required to support different types of emergency calls.

14. The method of claim 1, wherein the emergency setup message comprises at least one of an indication of how the emergency setup message was initiated, a registration priority request, information pertaining to the IVS, a vehicle type, a vehicle identification number, and a position estimate.

15. An apparatus for establishing an emergency call, comprising:

means for triggering an emergency in a vehicle comprising an in-vehicle system (IVS) for making an emergency call via a mobile network;

means for generating an emergency setup message at the IVS;

means for transmitting the emergency setup message from the IVS to the mobile network, wherein the emergency setup message is used for registering the IVS on the mobile network; and means for initiating an emergency call by the IVS using the emergency setup message.

16. The apparatus of claim 15, further comprising means for receiving a high priority for registration of the IVS on the mobile network responsive to the emergency setup message being received at the mobile network.

17. The apparatus of claim 16, wherein the IVS is registered on the mobile network with the high priority.

18. The apparatus of claim 17, wherein the means for initiating an emergency call by the IVS performs initiation over the mobile network after the IVS is registered on the mobile network.

19. The apparatus of claim 15, wherein the IVS is only operable to place a call in emergency mode.

20. The apparatus of claim 15, wherein the emergency setup message is different from a registration message for registering a device on the mobile network.

21. The apparatus of claim 15, wherein the emergency setup message comprises a service category information element having at least one bit used for an emergency call indicator.

22. The apparatus of claim 21, wherein the at least one bit comprises a first bit indicating a high priority registration request and a second bit indicating an emergency call only IVS.

23. The apparatus of claim 15, wherein the IVS is registered immediately on the mobile network responsive to the emergency setup message being received at the mobile network.

24. The apparatus of claim 23, wherein the IVS is registered immediately on the mobile network regardless of whether the mobile network is a visited network or a home network.

25. The apparatus of claim 15, wherein the mobile network is a visited network.

26. The apparatus of claim 15, wherein the mobile network is a home network.

27. A non-transitory computer-readable medium comprising instructions that cause a computer to:

trigger an emergency in a vehicle comprising an in-vehicle system (IVS) for making an emergency call via a mobile network;

generate an emergency setup message at the IVS;

transmit the emergency setup message from the IVS to the mobile network, wherein the emergency setup message is used for registering the IVS on the mobile network; and initiate an emergency call by the IVS using the emergency setup message.

28. The computer-readable medium of claim 27, further comprising computer-executable instructions that cause the computer to receive a high priority for registration of the IVS on the mobile network responsive to the emergency setup message being received at the mobile network.

29. The computer-readable medium of claim 28, wherein the IVS is registered on the mobile network with the high priority.

30. The computer-readable medium of claim 29, wherein the computer-executable instructions that cause the computer to initiate an emergency call by the IVS perform initiation over the mobile network after the IVS is registered on the mobile network.

31. The computer-readable medium of claim 27, wherein the IVS is only operable to place a call in emergency mode.

32. The computer-readable medium of claim 27, wherein the emergency setup message is different from a registration message for registering a device on the mobile network.

33. The computer-readable medium of claim 27, wherein the emergency setup message comprises a service category information element having at least one bit used for an emergency call indicator.

34. The computer-readable medium of claim 33, wherein the at least one bit comprises a first bit indicating a high priority registration request and a second bit indicating an emergency call only IVS.

35. The computer-readable medium of claim 27, wherein the IVS is registered immediately on the mobile network responsive to the emergency setup message being received at the mobile network.

36. The computer-readable medium of claim 35, wherein the IVS is registered immediately on the mobile network regardless of whether the mobile network is a visited network or a home network.

37. The computer-readable medium of claim 27, wherein the mobile network is a visited network.

38. The computer-readable medium of claim 27, wherein the mobile network is a home network.

39. An apparatus for establishing an emergency call, comprising:

at least one processor that triggers an emergency in a vehicle comprising an in-vehicle system (IVS) for making an emergency call via a mobile network, and generates an emergency setup message at the IVS; and a transmitter that transmits the emergency setup message from the IVS to the mobile network, wherein the emergency setup message is used for registering the IVS on the mobile network, and transmits the emergency setup message from the IVS to initiate an emergency call.

40. The apparatus of claim 39, further comprising a receiver that receives a high priority for registration of the IVS on the mobile network responsive to the emergency setup message being received at the mobile network.

41. The apparatus of claim 40, wherein the IVS is registered on the mobile network with the high priority.

42. The apparatus of claim 41, wherein the emergency setup message for initiating an emergency call is transmitted by the IVS over the mobile network after the IVS is registered on the mobile network.

43. The apparatus of claim 39, wherein the IVS is only operable to place a call in emergency mode.

44. The apparatus of claim 39, wherein the emergency setup message is different from a registration message for registering a device on the mobile network.

45. The apparatus of claim 39, wherein the emergency setup message comprises a service category information element having at least one bit used for an emergency call indicator.

46. The apparatus of claim 45, wherein the at least one bit comprises a first bit indicating a high priority registration request and a second bit indicating an emergency call only IVS.

47. The apparatus of claim 39, wherein the IVS is registered immediately on the mobile network responsive to the emergency setup message being received at the mobile network.

48. The apparatus of claim 47, wherein the IVS is registered immediately on the mobile network regardless of whether the mobile network is a visited network or a home network.

* * * * *